United States Patent

Duponteil et al.

[19]

[11] Patent Number: 5,960,045
[45] Date of Patent: Sep. 28, 1999

[54] METHOD OF DIGITAL DIFFERENTIAL DEMODULATION

[75] Inventors: Daniel Duponteil, Vanves; Julie Yuan-Wu, Versailles, both of France

[73] Assignee: France Telecom, Paris, France

[21] Appl. No.: 08/891,031

[22] Filed: Jul. 10, 1997

[30] Foreign Application Priority Data

Jul. 16, 1996 [FR] France .................................. 96 08866

[51] Int. Cl.$^6$ .......................... H04L 27/14; H04L 27/16; H04L 27/22
[52] U.S. Cl. .......................... 375/324; 375/200; 329/371
[58] Field of Search .................................. 375/200, 206, 375/316, 377, 340, 324, 325, 330, 331, 344, 345, 346, 350, 328, 326; 329/304, 310, 371, 315, 345, 347

[56] References Cited

U.S. PATENT DOCUMENTS 4,969,159  11/1990  Belcher et al. .
5,506,862   4/1996  McIntosh .
5,754,599   5/1998  Ling et al. .............................. 375/340

FOREIGN PATENT DOCUMENTS

2 233 860   1/1991  United Kingdom .
WO 91 15912 10/1991  WIPO .

*Primary Examiner*—Chi H. Pham
*Assistant Examiner*—Jean B Corrielus
*Attorney, Agent, or Firm*—Oblon, Spivak, McClelland, Maier & Neustadt, P.C.

[57] ABSTRACT

A method of digital differential demodulation if which the signal to be demodulated is over sampled at a rate double the rate of the elements of the spread sequence, the products of a current sample and the preceding conjugated sample are calculated and these products are summed, possibly weighting them, in a window covering at least a part of the period of the information symbols, the real part of this sum is taken in order to obtain a decision sample used to reconstruct the information. The method is applicable to multiple access type transmissions with code division.

6 Claims, 6 Drawing Sheets

METHOD OF DIGITAL DIFFERENTIAL DEMODULATION

DESCRIPTION

1. Technical field

The aim of this invention is a method of digital differential demodulation. It finds application in transmission systems referred to as code division multiple access systems, or CDMA in abbreviated form. Such technology is used in mobile radio systems.

2. State of the Prior Art

The description of the state of the technology that will follow refers to eight documents, the references for which are given at the end of the description.

Code division multiple access, as a technique for dividing the radio channel is often considered as a basis for defining future third generation mobile radio systems. It is also used in certain present day telecommunications systems with terrestrial mobiles or through satellites [1]. CDMA allows the simultaneous occupation of one and the same radio channel by signals transmitted by several or to several mobile terminals due to the spread spectrum nature of direct sequence spread spectrum systems. This type of cohabitation peculiar to CDMA is only made possible thanks to the use of spread spectrum modulation.

In spread spectrum modulation, the transmitted signal occupies a frequency band much wider than the band required for a transmission using standard modulation [6]. Two spread methods exist: spread by frequency jump and spread by direct sequence [6]. The spread factor, which is the ratio of the band occupied to the transmitted flow of information, is an important parameter. In the system mentioned in reference [1], it is 128.

The spread spectrum modulation technique constitutes a particularly flexible access technique. It is, in effect possible to transmit signals simultaneously in the same frequency band without any co-ordination. Furthermore, in the mobile radio field, CDMA arouses particular interest insofar as it offers the opportunity of an original way of processing the multiple links generated by the propagation.

Figure 1:
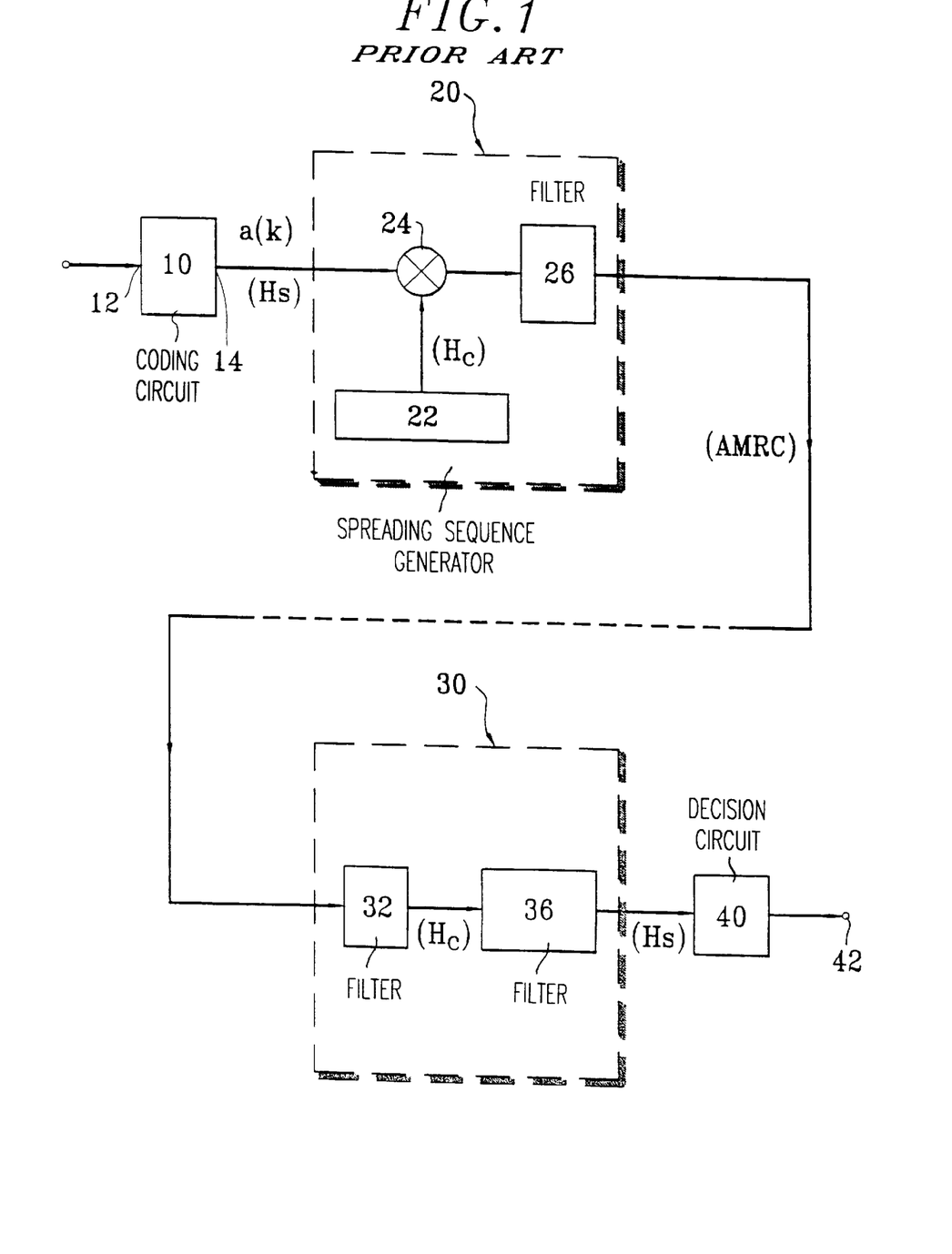
FIG. 1, already described, is a functional diagram of the code division multiple access technique.
Figure 2A:
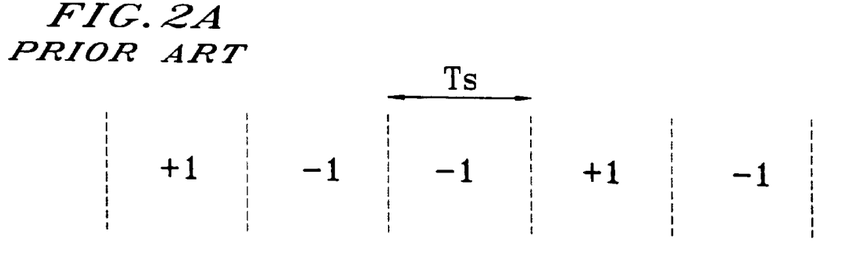
FIG. 2, already described, shows some signals that illustrate the principle of this technique.
Figure 2B:
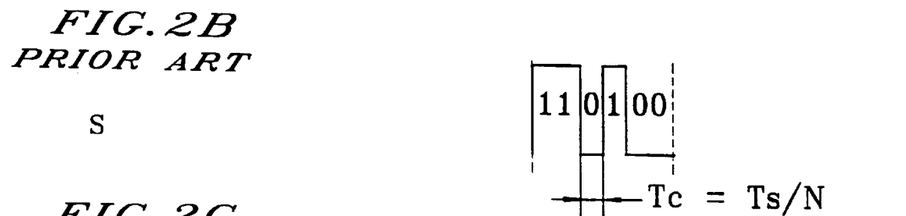
Figure 2C:
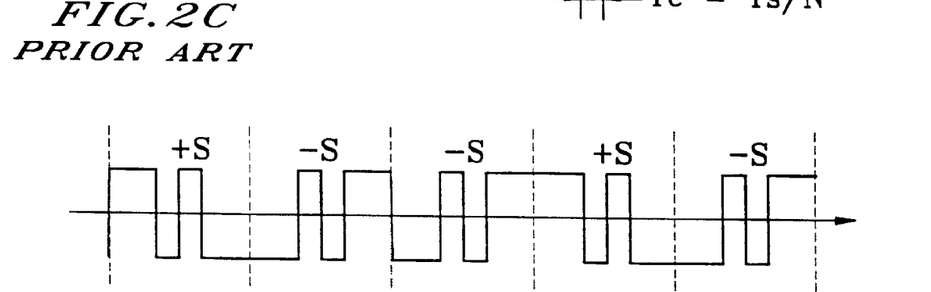
Figure 2D:
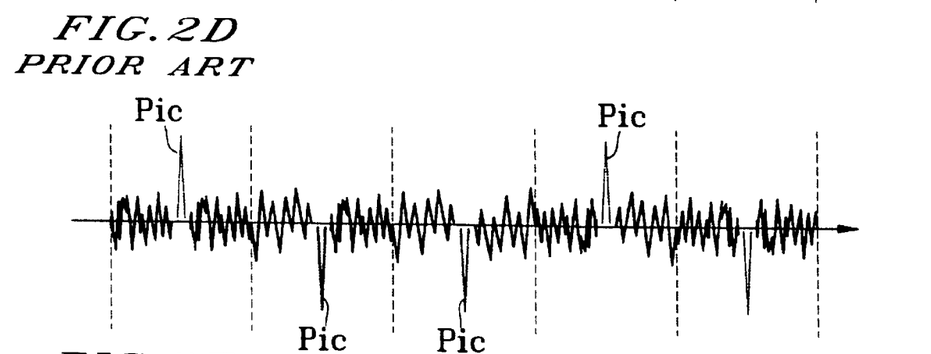
Figure 2E:
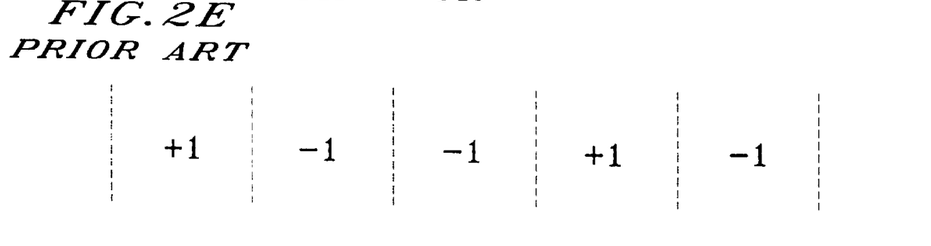

The functional diagram of CDMA modulation and demodulation is illustrated in FIG. 1 appended. This functional diagram is deliberately simplified, notably the RF (radio-frequency) stages do not appear in it, stages which allow one, on transmission, to transpose and to transmit the signal in the allocated frequency band and, on reception, to recover the signal in the allocated frequency band and to transpose it into the baseband where it will be processed. In this Figure, one sees, on the one hand, a spread spectrum circuit 20 used for the transmission and, on the other hand, an adapted filter circuit 30, used for the reception. The spread spectrum circuit 20 used for the transmission, receives information made up of a suite of marked binary symbols a (k), where k is an index marking the row of the symbol. These symbols can be received directly from an information source, or, as illustrated in FIG. 1, from a corrector coding circuit 10, which receives the raw information on its input 12 and delivers protected information on its output 14. The frequency of the information symbols is designated Hs.

The spread spectrum circuit 20 includes firstly a spread sequence generator 22. This sequence is formed from a suite of binary elements called "chips". This sequence is generally pseudo-random. The frequency of the chips is designated Hc. It is N times greater than the frequency Hs of the information symbols (Hc=NHs). Put another way, the period of the chips designated Tc, is N times smaller than the period of the symbols (Tc=Ts/N). The chips are designated $\alpha$ (n), where n designates the row of the chip in the sequence. This row runs from 0 to N −1 for one and the same sequence.

Each information symbol a(k) is multiplied by all the chips of the sequence $\alpha$ (n) in a multiplier 24. At the output of this multiplier, one then finds a signal made up of N pulses of width Tc. With the previous notations, the suite of these signals can be designated:

$a(k-1).\alpha(N-1)$, $a(k).\alpha(0), a(k).\alpha(1), a(k).\alpha(2), \ldots, a(k).\alpha(N-1)$, $a(k+1).\alpha(0), \ldots$, Such a signal has a rate, expressed in chips per second, N times greater than the rate in information symbols. The spectrum has therefore been spread in a ratio N.

The spread circuit 20 is completed by a filter 26 which is of the low-pass filter type.

The complete transmitter includes other means which have not been shown because they are well known to men skilled in the art, like, for example, a conversion oscillator to generate a carrier, a modulation circuit for this carrier, a transmission aerial, etc. . .

On the reception side, the circuit 30 includes, firstly, a low-pass filter 32 analogous to the filter 26 used for the transmission, and a filter 36 adapted to the spread sequence used for the transmission. More precisely, the pulse response of the filter of the receiver is the reverse in time of the pseudo-random sequence used in the transmitter. In other words, the adapted filter 36 carries out a convolution operation on the signal supplied by the first filter 32. The rate of the pulses at the input of the adapted filter 36 producing the convolution is equal to the rate Hc of the chips, but, after convolution, this rate falls to Hc/N or Hs.

A circuit 40 decides the value of the information received in relation to the value of the convolution signal. The information is then reconstructed on the general output 42.

In such a system, the information transmitted can be ordinary binary information, but it is more often information resulting from a prior operation known as differential coding. In this case the symbols a(k) are obtained by a preliminary differential encoder composed, for example, of an exclusive OR type logic gate and a delay circuit, the gate combining a current bit with the bit that precedes it. The symbols thus encoded are then multiplied by the pseudo-random sequence concerned.

As for modulation of the carrier, it can be of any known type, but often it is preferred to use phase modulation, notably, double phase shift keying, referred to as PSK2. In the receiver, it is sufficient to compare the phase of the symbol that is passing with the phase of the preceding symbol. The receiver does not therefore have to assess the phase of the symbols but only the phase difference between two successive symbols; hence the "differential" character of the method.

FIG. 2 permits illustration of the operation of the system, showing diagrammatically some signals appearing in the chain.

The binary information is represented on the line (a). This is a suite of binary symbols of period Ts, in this case the suite +1, −1, −1, +1, −1. The line (b) illustrates the spread sequence S formed from N chips, in this case 110100 (naturally, in practice, the number N is much greater than 6) The line (c) shows the result of the multiplication of the information signal of line (a) by the sequence S of line (b). A suite of patterns +S, −S, −S, +S, −S is obtained. The correlation signal supplied by the filter to the spread sequence is represented on line (d). Correlation peaks appear in the noise base, the sign of which allows the recovery of the patterns +S and −S. A decision can then be taken in order to reconstruct the original information (line e).

Figure 3:
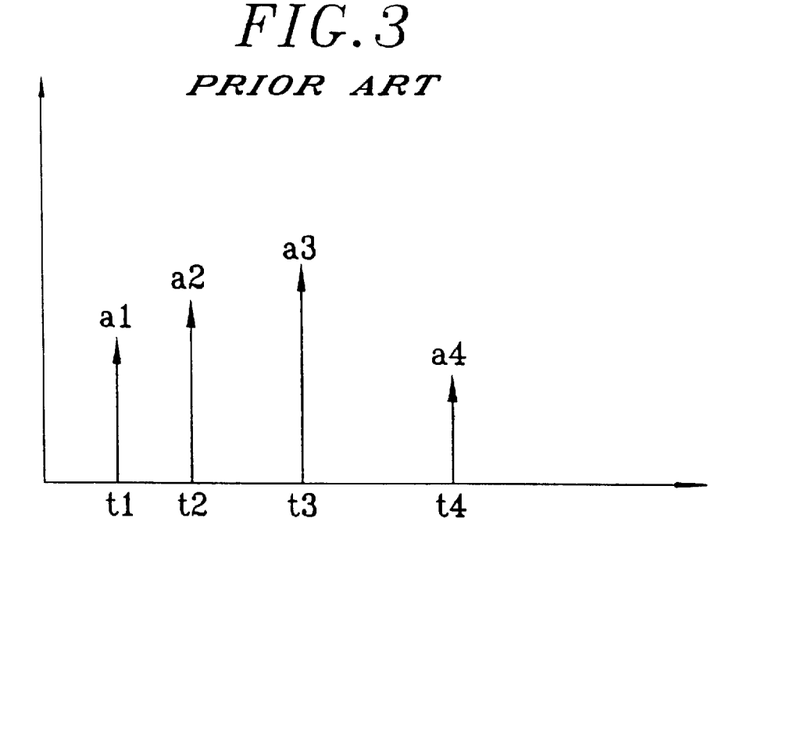
FIG. 3, already described, shows the pulse response to a mobile radio channel.

The diagrams in FIG. 2 are, in fact, rather theoretical since, in reality, the radio signal propagates in a complex manner between the transmitter and the receiver following several different paths [2], [3], [8]. The received signal arrives at the receiver at instants which are shifted. The pulse response of a mobile radio channel does not therefore have the form of a peak localised in time but rather in the form of a series of lines of varying amplitudes, as shown in FIG. 3 appended. Hence, one may see on this Figure four different responses situated at times t1, t2, t3 and t4 with four different amplitudes a1, a2, a3 and a4.

The optimum reception consists then of recognising in the received signal the patterns:

$$a1S(t-t1)+a2S(t-t2)+a3S(t-t3)+a4S(t-t4)$$

In practice this means that the receiver carries out the sliding correlation with the sequence S and must recombine the different peaks obtained for each of the paths present. Since there is a problem in the assessment of the paths, that is to say in knowing the parameters (a1,t1), ..., (a4,t4), one can make use of a pilot signal (a specific signal), as for example in the Qualcomm [1] and Globalstar systems.

The optimum receiver in FIG. 1 is then completed by a filtering adapted to the pulse response h(t) of the channel. From a mathematical point of view, the filtering adapted to the pulse response of the channel carries out a recombining of all the paths that exist. This operation is partially carried out in the receivers with a standard rake ("Rake Receiver"), [1],[3], which combines a limited number of paths.

Since the filtering adapted to the received pulse occurs at the rate of the chips, so that the receiver achieves the best performance possible with a given transmission channel, it is necessary that this rate should be high enough. For example, with an urban channel of the GSM-TU type [8], the existing paths can only all be taken into account with a chip rate greater than 5 Mchips/s.

Spread spectrum modulation is a technique that allows discrimination of the different paths that make up the transmission channel. The recombination of these paths provides performance gains which are very appreciable compared with a transmission that would have gone through an ordinary channel (called a Rayleigh) as one will see further on in relation to FIG. 7.

Though they give satisfaction in certain regards, all of these techniques are not for all that free of disadvantages. In particular, they are very complex to put into practice. For example, in the Qualcomm system, Standard IS-95, there is a demodulator per received path. The Standard recommends the use of five demodulators, three to demodulate the main paths and two supplementary demodulators to manage the existence of the paths, notably their appearances and disappearances. The rate of chips transmission of 1Mbit/s is matched to this number of demodulators. With much greater chip rates, necessary for transmitting services with higher throughputs, the potential number of paths that the receiver would be able to discriminate can be very large.

The aim of the invention is precisely to remedy these disadvantages.

SUMMARY OF THE INVENTION

To this end, the invention proposes a method of demodulation of which one of the essential characteristics is to implement an asynchronous sampling of frequency which is double the chips frequency, that is to say, at the frequency 2 Hc. In effect, and as was shown in FIG. 3, a standard optimum reception requires that one combines samples taken exactly at the instants t1, t2, t3, ... But, as will be better understood from what follows, an asynchronous sampling at the rate of the chips, that is to say at the frequency Hc, can lead to missing one, two or indeed all of the received paths, if the sampling times do not coincide exactly with the times t1, t2, t3 . . .

According to this invention, an asynchronous sampling is implemented at double the rate, that is to say at two times the frequency of the chips (2 Hc). If one does not sample at the optimum instant t1, t2 or t3, nevertheless there are two samples available from the same path and it is no longer possible to miss any path. The inventors have verified that, in practice, the recombination of these samples provides the same information as the sample taken at the optimum instant and this even though the corresponding samples of noise are correlated. This property is not borne out for a greater number of samples. In effect, for a greater number of samples, it is observed that the performance deteriorates.

For each symbol of row k, instead of obtaining N samples Z (k,i) with i going from 1 to N, one obtains, according to the invention 2N. The demodulation carried out is still of the differential type. It is described as integral by the inventors in the sense that it takes account of all the significant received paths. According to the invention, one calculates, for each index i, the product of a sample Z(k,i), and the conjugated preceding sample, or Z*(k −1,i) and one makes the sum of these products over the 2N samples available. As the samples are, in fact, complex quantities, one calculates the real part of this sum, or the quantity $$\text{Real}\left\{\sum_{i=1}^{2N} Z(k, i) \cdot Z^*(k-1, i)\right\} \equiv U(k, i)$$

This quantity U(k,i) is used to take the decision on the binary value of the received information This decision is taken by comparing the quantity obtained at a zero value threshold as is usual for PSK2. This quantity can also be preserved in analogue form for a possible protective processing against transmission error.

In the absence of any indication on the pulse response of the channel, that is to say on the spread and the amplitude of the paths, it is however possible to be limited to a time window that is narrower than the duration of a transmitted symbol. In effect, each environment possesses its own propagation characteristics. For example, the spread of paths in the large cells in an urban environment can reach 5 microseconds while inside buildings, it is of the order of a few tenths of a microsecond [4]. During the setting up of a mobile radio network, the propagation conditions are the subject of accurate measurements and the value of this significant parameter is well known. As a consequence, the calculation of the decision variable will be limited to an interval of duration equal to the duration of spread corresponding to the utilisation demodulation is then based on the calculation of the quantity:

$$\text{Real}\left\{\sum_{i=M}^{i=P} Z(k, i) \cdot Z^*(k-1, i)\right\}$$

where M corresponds to the index at the of the time window and P to the index of the window. M is greater or equal to 1 and P less than or equal to 2N.

The method of the invention can also be implemented by limiting the calculation of the decision sample to only significant samples. With this way of working, one can use a threshold on the amplitude of the received samples, This threshold can be adjusted from the automatic gain control signal, which allows one to maintain the power of the demodulated signal at a constant level. This device is found in all transmitters/receivers for transmission on a radio channel, and it is also necessary for good operation of a CDMA receiver. The integral demodulation is then only applied to those samples whose amplitude exceeds the threshold. This way of working permits the elimination of a certain number of noise samples.

In one particular variant, one uses not their instantaneous amplitudes but their mean amplitudes, calculated on K bits, in order to validate the samples and a threshold adapted to this particular processing.

In the detection of the bit in row k, one therefore proposes, as a control signal to use the quantities $$A(k, i) = \left[\frac{1}{K}\left|\sum_{i=0}^{K-1} Z^2(k-1, i)\right|\right]^{1/2}$$

In effect, so as to eliminate the modulation due to the information bits, it is necessary to work on squared amplitudes. These quantities constitute good indicators of the existence of paths. Their use brings about a certain improvement in relation to a more usual control signal such as the instantaneous amplitude. The threshold S(k) to be used at the instant k is proportional to the maximum value $$M(k) = \max_i A(k, i).$$

One has S(k)=mM(k) with m less than 1. One can then weight the samples by a weighting factor P(k,i) which is a function of the quantity A(k,i).

The knowledge of the amplitude of the paths can be used in the quantity to be calculated in order to take the decision. It is in this way that performance is improved with the two quantities $$\text{Real}\left\{\sum_{i=M}^{i=P} A(k, i) \cdot Z(k, i) \cdot Z^*(k-1, i)\right\},$$

$$\text{Real}\left\{\sum_{i=M}^{i=P} A^2(k, i) \cdot Z(k, i) \cdot Z^*(k-1, i)\right\}$$

To put it precisely, the aim of this invention is therefore a method of digital differential demodulation for a signal obtained by differential modulation with a spread spectrum, this signal having been obtained from an item of information formed from a suite of symbols a(k) having a certain duration (Ts), each symbol a(k) having been multiplied by a spread sequence of the same duration (Ts) and made up of N binary elements each having a duration (Tc) which is N times less than the duration of the symbols (Tc=Ts/N), this method of digital differential demodulation being characterized by the fact that it includes the following operations a) the received signal is over sampled every Tc/2 seconds to obtain 2N complex digital samples for each period Ts of the signal, these 2N samples being designated Z (k,i) where the index k is the row of the symbol of period Ts and i the row of the sample in the period Ts, the index i going from 1 to 2N, b) for each current sample Z(k,i), one considers the sample with the same index i but situated in the preceding symbol of row k−1, or Z (k−1,i), and one forms the conjugated complex of this preceding sample or Z*(k−1,i), c) one forms the product of the current sample and the conjugated preceding sample, or Z(k,i).Z*(k−1,i), d) one forms the sum, possibly weighted by weighting coefficients P(k,i) of these products on one part at least of the period Ts, that is to say, for the row i going from a whole number M greater or equal to 1 to a whole number P less than or equal to 2N, e) one takes the real part U(k,i) of this sum, which gives a decision sample that allows the reconstruction of the information item corresponding to the symbol in row k.

DETAILED DESCRIPTION OF EMBODIMENTS

Figure 4:
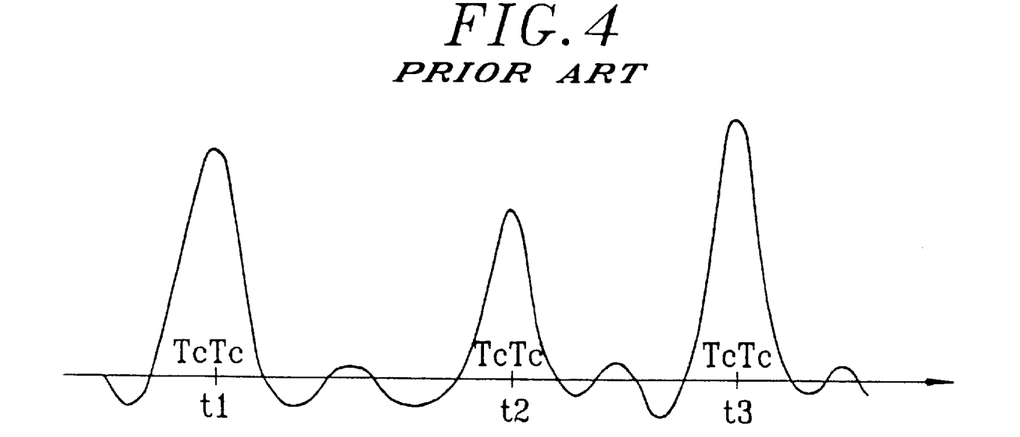
FIG. 4 shows the output from the adapted filter to the spread sequence in the case of a multipath mobile radio channel.

FIG. 4 shows the pulse response of the mobile radio channel as it appears at the output of the filter adapted to the spread sequence (that is to say at the output of filter 36 in the diagram in FIG. 1). These responses have a width at the base of the peaks equal to 2 Tc but these peaks are narrow and, taking a single sample every Tc seconds, one may very well not sample the signal correctly. According to a first characteristic of the invention, the samples are therefore taken at the rate of two per chip. This rate corresponds to an oversampling of the signal and allows one not to miss a path. The advantage of this oversampling is that it does not require the perfect localisation of each path as is the case in the receivers in a standard network.

This particular feature of oversampling naturally does not modify the transmission process, but assumes that the receiver is modified in order to implement it and is completed by a circuit for calculating the sums of products previously specified. Such a receiver is shown diagrammatically in FIG. 5.

Figure 5:
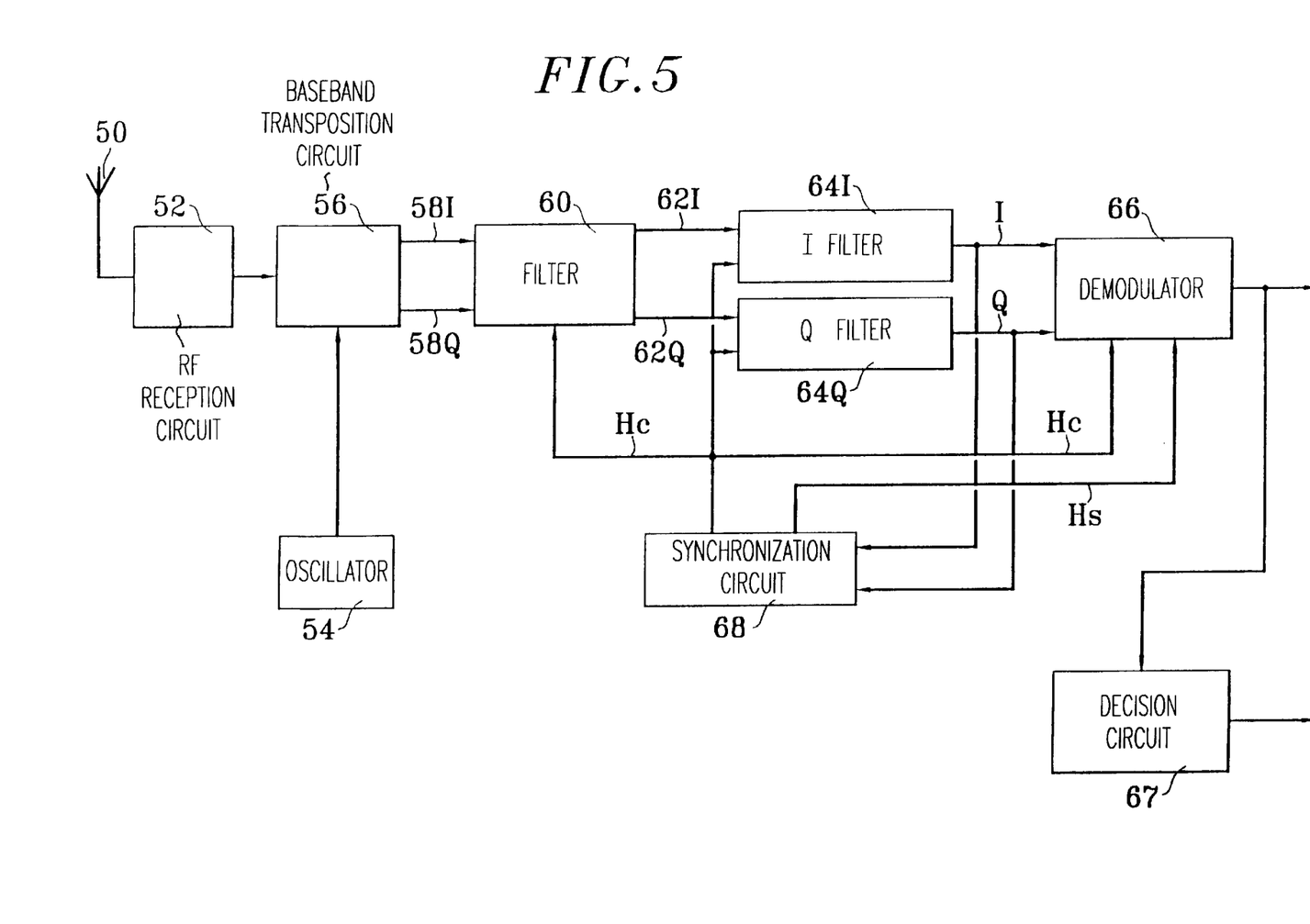
FIG. 5 is a synoptic diagram of a receiver implementing the digital integral differential demodulation method according to the invention.

Firstly, it includes a receiving aerial 50, a radio frequency reception stage 52, an oscillator 54 for converting to the RF frequency or to an intermediate frequency and a baseband transposition circuit 56 which is connected to the circuit 52 and to the conversion oscillator 54. The circuit 56 supplies two analogue signals, traditionally marked by letters I and Q, which are the signals that represent the parts of the received signal respectively in phase and in phase quadrature, are supplied onto two connections 58I, 58Q. All of this part of the receiver is standard. The signals are then sampled at the frequency 2 Hc and filtered in the circuit 60.

This filtering carried out in digital fashion is adapted to the chip pulse form used on transmission in the filter 26 of FIG. 1. The circuit 60 therefore supplies, on two outputs 62I and 62Q, suites of 2N samples per period Ts. These samples are then the object of a filtering adapted to the spread sequence used on transmission in two filters 64I and 64Q, which deliver two sampled signals which will subsequently be designated more simply I and Q. These two signals are applied to a demodulator circuit 66 whose output is connected to a decision circuit 67. In addition, the signals I and Q are addressed to a synchronisation circuit 68, which supplies, at the same time, the clock Hc relating to the chips, which allows the sampling in the circuit 60 and the processing in the demodulator 66, and the clock Hs relating to the information symbols.

Figure 6:
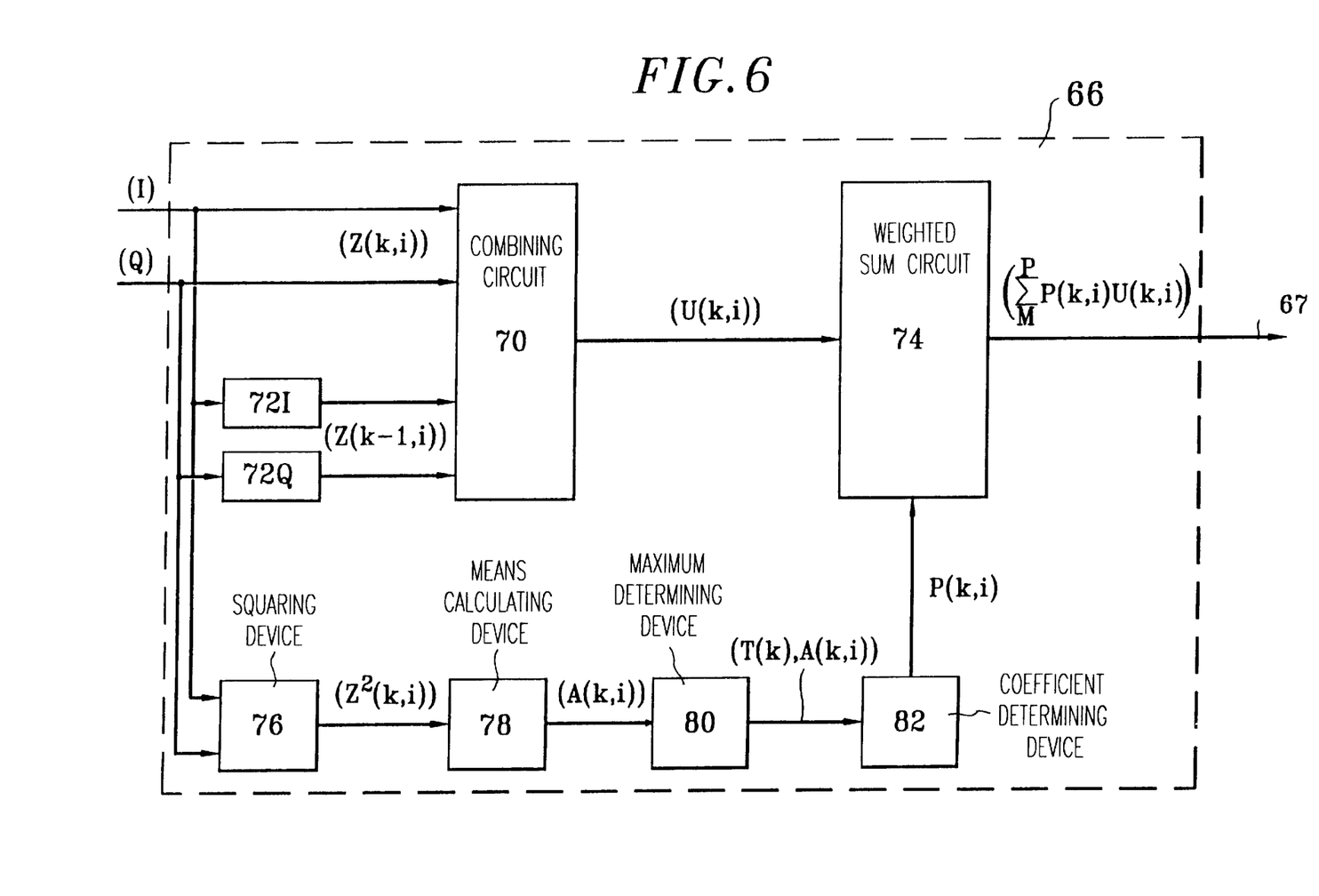
FIG. 6 is an actual synoptic diagram

FIG. 6 shows the architecture of the demodulator 66, which permits calculation of the quantities previously defined. This demodulator includes firstly a circuit 70 for calculating products of the form $Z(k,i) \cdot Z^*(k-1,i)$ where $Z(k,i)$ is a complex sample of rows k and i and $Z^*(k-1,i)$ the conjugated complex sample of the row preceding k in the order of the sequences but of the same row i within a sequence. To calculate this type of product, circuit 70 receives the samples I and Q from rows k and i directly, which corresponds to $Z(k,i)$, and the samples $I(k-1,i)$ and $Q(k-1,i)$ delayed by time Ts, that is to say delayed by 2N samples These delayed samples are supplied by two delay circuits 72I, 72Q.

The circuit 70 having formed the product $Z(k,i) \cdot Z^*(k-1,i)$, it takes the real part of it, or $U(k,i)$. A circuit 74 receives this signal and forms a weighted sum with the help of weighting coefficients $P(k,i)$ and this in a window going from row M to row P or:

$$\sum_{M}^{P} P(k,i) \cdot U(k,i)$$

This sum constitutes the decision taking sample which will be directed to the decision taking circuit.

The circuit shown includes, in addition, a circuit 76 which receives I and Q and calculates the square of $Z(k,i)$. It further includes a circuit 78 which calculates a quantity $A(k,i)$ which is the mean defined by:

$$A(k,i) = \left[ \frac{1}{K} \left| \sum_{j=0}^{j=K-1} Z^2(k-j,i) \right| \right]^{1/2}$$

A circuit 80 determines the maximum value taken by $A(k,i)$ when the row i varies, or $S(k)=\text{Max} A(k,i)$. The circuit 80 takes a fraction $sS(k)$ of this value, which constitutes a threshold $T(k)$.

A circuit 82 then calculates weighting coefficients $P(k,i)$ in the following way:
  if the mean $A(k,i)$ is less than the threshold $T(k)$, the weighting coefficient $P(k,i)$ is taken equal to 0; or to put it another way, the samples that have not crossed the threshold are not taken into account;
  if the mean $A(k,i)$ is greater than or equal to the threshold $T(k)$, then the weighting coefficient is taken as equal to 1 (that is to say that in fact there is no weighting) or it is taken as equal to $A(k,i)$, or to $A^2(k,i)$.

Figure 7:
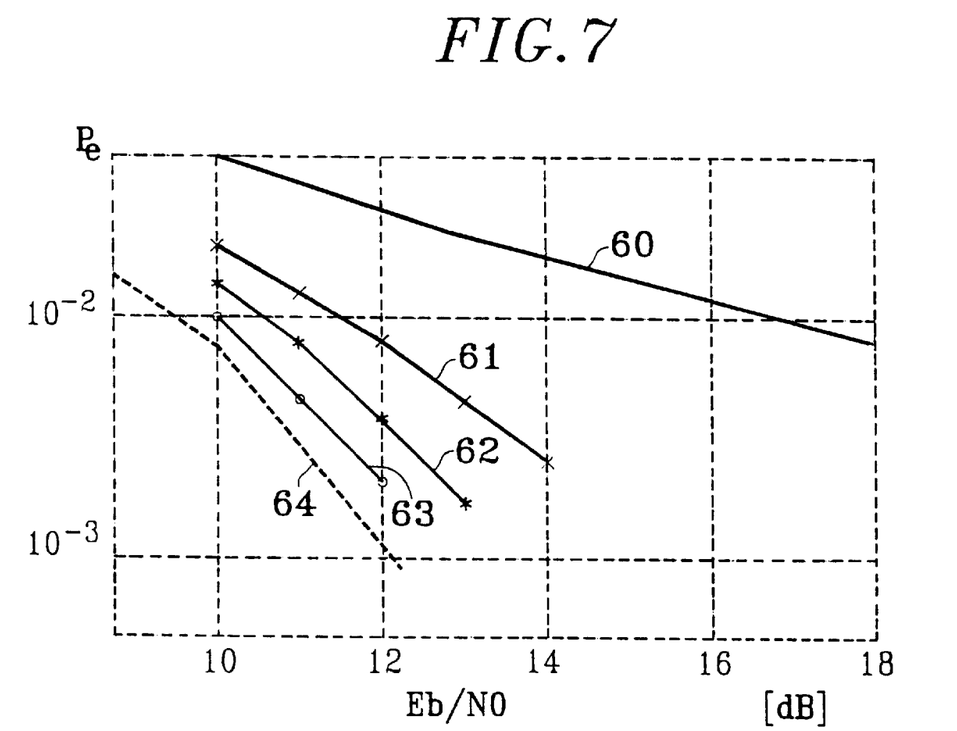
FIG. 7 shows the performance of the digital integral differential demodulation on a six path channel.

FIG. 7 illustrates the performance of the method of the invention. This Figure shows the probability of error in relation to the level of the signal expressed in decibels, for several chip rates. The curves shown correspond to the GSM-TU channel with six paths except for the curve 60 which represents a RAYLEIGH channel. The curves 61, 62, 63 are curves obtained with chip rates respectively of 1, 2 and 4 Mchips/s. Curve 64 is the ideal curve corresponding to a rake receiver with six branches, including six demodulators with correlation in parallel, perfectly synchronised. This reference curve assumes ideal spread sequences (auto-orthogonal) and would not therefore be achieved in a Qualcomm type of system. It does not depend on the chip rate but assumes implicitly that this rate is sufficiently high for the different paths to be able to be separated (of the order of 4 to 5 Mchips/s).

FIG. 7 clearly makes apparent the influence of the chip rate on the performance of the digital integral differential demodulator. As has just been explained, the chip pulses must be of a duration of the order of the smallest time interval separating two successive paths for the demodulator to be able to recombine the paths.

FIG. 7 shows, above all that the digital integral differential demodulator provides a performance very close to the ideal. The remaining out-of-synchronisation error can be explained by the autocorrelation noise, insofar as the sequences used are not auto-orthogonal but simply pseudo-random, as in the Qualcomm system.

[1] A. Salmasi, K. S. Gilhousen, "On the System Design Aspects of Code Division Multiple Access (CDMA) Applied to Digital Cellular and Personal Communications Networks", 41st IEEE Vehicular Technology Conference, May 1991, pp. 57–62.

[2] W. C. Jakes Jr. , "Microwave Mobile Communication", John Wiley, 1974.

[3] G. L. Turin, "Introduction to Spread Spectrum Antimultipath Techniques and their Applications to Urban Digital Radio", Proceedings of the IEEE, Vol. 68, No. 3, March 1980, pp. 328–353.

[4] H. Hashemi, "The Indoor Propagation Channel", Proceedings of the IEEE, Vol. 81, July 1993, pp. 943–968.

[5] J. C. Bic, D. Duponteil, J. C. Imbeaux, "Eléments de Communications Numériques", Collection Technique et Scientifique des Télécommunications, Dunod, 1986.

[6] M. K. Simon, J. K. Omura, R. A. Scholtz, B. K. Levitt, "Spread Spectrum Communications", Computer Science Press, 1985.

[7] M. Kaverhead, G. E. Bodeep, "Design and Experimental Results for a Direct Sequence Spread Spectrum Radio Using Differential Phase-Shift-Keying Modulation for Indoor Wireless Communications", IEEE Journal on Selected Areas in Communications, Vol. SAC-5, No. 5, June 1987.

[8] ETSI, "European Digital Cellular Telecommunications System (Phase 2) ; Radio Transmission and Reception, (GSM 05.05)", 1994.

We claim:

1. A method of digital differential demodulation for a signal obtained by differential modulation with spectrum spread, the signal having been obtained from an item of information formed from a suite of symbols (a(k)) having a certain duration (Ts), each symbol of said suite of symbols (a(k)) having been multiplied by a spread sequence of the certain duration (Ts) and made up of N binary elements each having a duration (Tc) N times less than a duration of symbols (Tc=Ts/N), comprising steps of:
  a) oversampling the received signal every Tc/2 seconds to obtain 2N complex digital samples for each certain duration Ts of the signal, the 2N complex digital samples being marked Z (k,i) where the index k is a row of each symbol of the certain duration Ts and the index i being a row of each sample in the certain duration Ts, the index i going from 1 to 2N;

b) forming a conjugated complex Z*(k−1,i) of a preceding sample Z (k−1,i) given that a current sample is indicated as Z (k,i), and the preceding sample Z (k−1,i) having the same index i but situated in row k−1;

c) multiplying the current sample Z(k,i) and the conjugated complex Z*(k−1,i) of the preceding sample and taking a real part U (k,i) to obtain a product;

d) forming a sum of the product with other products that correspond with samples taken during the certain duration Ts, after first applying weighting coefficients (P(k,i)) to the product and the other products, for the row i going from a whole number M greater or equal to 1 to a whole number P less than or equal to 2N so as to provide a decision sample that allows for reconstruction of the item of information corresponding to the symbol in row k and thus demodulating the signal.

2. A method according to claim 1 wherein:

said forming a sum step includes summing the product with other products over a totality of the certain duration (Ts) of each symbol, where index i taking on all values between M=1 and P=2N.

3. A method according to claim 1, further comprising steps of;

calculating a square of amplitudes of the samples, ($Z^2$(k−j,i)); calculating a sum of K successive values from said calculating a square step with j going from 0 to K−1;

dividing an absolute value of the sum of K successive values by K so as to obtain a result; and taking a square root of the result obtained so as to give a mean quantity (A(k,i)); and determining maximum value (S(K)) of the mean quantity (A(k,i)) and taking a fraction (sS(k)) of the maximum value, which constitutes a threshold (T(k)).

4. A method according to claim 3, wherein:

said forming a sum step includes weighting the product and other products with a weighting coefficient of zero when the mean quantity (A(k,i)) is less than the threshold (T(k)).

5. A method according to claim 3, wherein:

said forming a sum step includes weighting the product and other products with the weighting coefficients (P(k,i)) equal to the mean quantity (A(k,i)) when the mean quantity (A(k,i)) is greater than the threshold (T(k)).

6. A method according to claim 3, wherein:

said forming a sum step includes weighting the product and other products with the weighting coefficients (P(k,i)) equal to a square of the mean quantity (A(k,i)) when the mean quantity (A(k,i)) is greater than the threshold (T(k)).

* * * * *